United States Patent
Haartsen

(10) Patent No.: US 8,243,634 B2
(45) Date of Patent: Aug. 14, 2012

(54) RANDOM ACCESS IN TIME DIVISION DUPLEX COMMUNICATION SYSTEMS

(75) Inventor: Jacobus Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1012 days.

(21) Appl. No.: 11/828,315

(22) Filed: Jul. 25, 2007

(65) Prior Publication Data

US 2008/0219190 A1 Sep. 11, 2008

Related U.S. Application Data

(60) Provisional application No. 60/893,431, filed on Mar. 7, 2007, provisional application No. 60/911,730, filed on Apr. 13, 2007.

(51) Int. Cl.
*H04J 3/00* (2006.01)
(52) U.S. Cl. .................................... 370/280; 370/294
(58) Field of Classification Search .......... 370/276–296; 455/73
See application file for complete search history.

(56) References Cited

U.S. PATENT DOCUMENTS

| 2004/0208253 | A1* | 10/2004 | Joo | 375/260 |
| 2005/0025095 | A1 | 2/2005 | Kim | |
| 2005/0078771 | A1* | 4/2005 | Oh et al. | 375/317 |

FOREIGN PATENT DOCUMENTS

| WO | 01/67620 A | 9/2001 |
| WO | WO 0167620 A2 * | 9/2001 |
| WO | 02/087104 A2 | 10/2002 |
| WO | 2007/089199 A2 | 8/2007 |

OTHER PUBLICATIONS

Third Generation Partnership Project Technical Report TR 25.814 3GPP TSG RAN: Physical layer aspects for evolved Universal Terrestrial Radio Access (UTRA) (Release 7), V7.1.0, Sep. 2006.
Third Generation Partnership Project Technical Specification TS 36.211, "3GPP TSG RAN; Physical Channels and Modulation (Release 8)" V0.20.0, Nov. 2006.
3GPP TSG-RAN WG1 Meeting #47bis "Preamble design of non-synchronized RACH for E-ETRA TDD" Sorrento, Italy, Jan. 15-19, 2007, R1-070286.
3GPP TSG-RAN WG1 Meeting #47bis "Idle Period position for E-UTRA TDD with Generic frame structure" Sorrento, Italy, Jan. 15-19, 2007, R1-070372.

(Continued)

*Primary Examiner* — Derrick Ferris
*Assistant Examiner* — Mang Yeung
(74) *Attorney, Agent, or Firm* — Potomac Patent Group PLLC

(57) ABSTRACT

A mobile terminal is operated in a cellular communications system that comprises a base station operating in a time division duplex mode. The mobile terminal detects a downlink transmission from the base station and determines therefrom a future moment in time at which an end part of a downlink transmission just prior to a random access window will become detectable at the mobile terminal. An uplink random access transmission is begun at a moment in time that is before the future moment in time. The moment in time that is before the future moment in time can be a fixed amount of time before the future moment in time. If the mobile terminal is not near the edge of the cell, the base station may consequently receive only a partial uplink random access transmission, but this does not detrimentally affect performance.

20 Claims, 10 Drawing Sheets

OTHER PUBLICATIONS

3GPP TSG-RAN WG1 #48 "Idle periods for E-UTRA TDD" St. Louis, USA, Feb. 12-16, 2007, R1-071024.

PCT International Search report, mailed Apr. 24, 2008, in connection with International Application No. PCT/EP2008/051327.

PCT Written Opinion, mailed Apr. 24, 2008, in connection with International Application No. PCT/EP2008/051327.

Ericsson: "Random Access Procedures for LTE" 3GPP TSG-RAN WG1 and WG2 Joint Meeting, vol. TDOC R2-60866, Mar. 27, 2006, XP003019458.

Motorola et al: "E-UTRA Random Access Channel TP" Internet Citation, Mar. 27, 2006, XP002402447. Retrieved from the Internet: URL: http://www.3gpp.org/ftp/tsg_ran/WG1_RL1/TSGR1_44bis/Docs/>.

PCT International Preliminary Report on Patentability, dated Sep. 8, 2009, in connection with International Application No. PCT/EP2008/051327.

Russian Office Action, issued Aug. 22, 2011, in connection with Russian Application No. 2009136988.

Russian Office Action, issued Aug. 22, 2011, in connection with Russian Application No. 2009136988 (Translation).

Nevdyaev, L.M. "Telekommunicatsionnye Tekhnologii" (Telecommunications Technologies), Moscow, "Svyaz I Biznes" (Communications and Business Publishing House), 2002, p. 48.

\* cited by examiner

RANDOM ACCESS IN TIME DIVISION DUPLEX COMMUNICATION SYSTEMS

CROSS REFERENCE TO RELATED APPLICATIONS

This application claims the benefit of U.S. Provisional Application No. 60/893,431, filed Mar. 7, 2007, which is hereby incorporated herein by reference in its entirety. This application also claims the benefit of U.S. Provisional Application No. 60/911,730, filed Apr. 13, 2007, which is hereby incorporated herein by reference in its entirety.

BACKGROUND

The present invention relates to time division duplex mobile communication systems, more particularly to random access procedures in time division duplex communication systems, and even more particularly to guard periods for use as part of random access procedures in time division duplex communication systems.

In modern cellular radio communication systems, the radio network strictly controls the behavior of the terminal. Uplink transmission parameters like frequency, timing, and power are regulated via downlink control messages from the NodeB (e.g., in systems such as the Universal Mobile Telecommunication Systems—"UMTS") or other type of base station (BS) to the mobile terminal (e.g., User Equipment—"UE"— in UMTS (3G)-type systems, and Mobile Station—"MS"— in Global System for Mobile communication (GSM)-type systems).

The uplink timing is of particular importance. Modern digital wireless systems make use of time slots or frames. Sharing of the air interface in such systems includes a Time Division Multiple Access (TDMA) component, whereby consecutive time slots and/or frames are allocated to different users. In order to avoid any overlap between consecutive uplink packets from different users, a strict uplink timing control is required.

In cellular networks having a cell radius that can range from a few kilometers to tens of kilometers, it is necessary to take into account the radio signal's time of flight (i.e., the propagation delay between a transmitter antenna and a receiver antenna). That is, the extra time delay over the radio propagation path from the UE results in delayed arrival times of the packets at the NodeB. The amount of additional delay experienced depends on the distance d between the NodeB and the UE. Since the UE timing (in both the uplink and the downlink directions) is based on the downlink control signals, which are by themselves delayed by the same propagation delay, the aggregate timing mismatch, $\Delta t$ in the uplink amounts to twice the propagation delay d/c, where c is the speed of light. The value $\Delta t$ thus represents the round-trip delay (RTD) over the air.

In communication systems that use Time Division Duplexing (TDD), the radio transceivers at the NodeB and the UE cannot transmit and receive simultaneously. That is, a transceiver must finalize a complete reception operation before starting transmission, and conversely, an entire transmission operation must be finalized before starting reception. At no point in time may the uplink and downlink signals overlap at the antenna of the NodeB or at the UE.

During operation, the UE must be synchronized with the NodeB. However, upon power-on or after a long standby or sleep time, the UE is not synchronized in the uplink. Unlike the uplink frequency and power estimate, which the UE can derive from the downlink (control) signals, it is difficult to make a timing estimate for the uplink because the round-trip propagation delay between the NodeB and the UE is unknown. Therefore, before commencing traffic, the UE has to carry out a random access (RA) procedure to the network. Since the uplink timing is not time aligned yet, a large guard period is needed. The guard period needs to be at least as long as the maximum aggregate timing mismatch, $\Delta t_{max}$, which is determined by the most distant users, namely the ones on the cell edges which are at the greatest distance from the NodeB. This results in quite an overhead because the guard period cannot be used for transmissions. For cell sizes up to 15 km, a guard period of at least 100 µs is required. For cell sizes up to 30 km, a guard time of at least 200 µs is required.

Due to the unknown round-trip delay, conventional solutions require a large guard time at the RA window. Although the RA procedure is used infrequently (at power-up and when UL synchronization has been lost), this overhead needs to be included in every frame in order to support the most distant users while retaining the latency requirements. For larger cell sizes, longer guard times are required as well as longer preambles in order to preserve the power received by the NodeB. This further increases the overhead.

There is therefore a need for improved RA procedures that do not require such a large resource overhead.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that affect operation of a mobile terminal in a cellular communications system that comprises a base station operating in a time division duplex mode. In an aspect of embodiments consistent with the invention, the mobile terminal detects a downlink transmission from the base station and determines therefrom a future moment in time at which an end part of a downlink transmission just prior to a random access window will become detectable at the mobile terminal. The mobile terminal begins an uplink random access transmission at a moment in time that is before the future moment in time.

The moment in time that is before the future moment in time can be a moment in time that is a fixed amount of time before the future moment in time. In some embodiments, the fixed amount of time corresponds to a maximum possible round trip delay between the base station and the mobile terminal.

In some embodiments, the uplink random access transmission comprises a body and a cyclic prefix, the cyclic prefix comprising an end portion of the body.

In another aspect of embodiments consistent with the invention, methods and apparatus effect operation of a base station in a time division duplex mode in a cellular communications system. Such operation comprises receiving at least a portion of an uplink random access transmission from one of the one or more mobile terminals during a random access window that begins directly after a downlink transmission directed to one or more mobile terminals, wherein a duration of the random access window, $T_{RA\_window}$ satisfies the following relationship:

$$T_{RA\_window} < T_{PR} + RTD_{max},$$

where $T_{PR}$ is a duration of the uplink random access transmission, and $RTD_{max}$ is a maximum possible round trip delay between the base station and any one of the one or more mobile terminals.

In some embodiments, $T_{RA\_window}$ satisfies:

$$T_{RA\_window} = T_{PR} + T_{UD},$$

wherein $T_{UD}$ is a duration of an uplink-downlink switching time.

In some embodiments, the uplink random access transmission comprises a preamble body and a cyclic prefix; the preamble body has a duration of $T_{PRE\_BODY}$; and the cyclic prefix has a duration of $T_{CP}$, whereby $T_{PR} = T_{CP} + T_{PRE\_BODY}$.

The presence of a cyclic prefix enables processing to be performed in the frequency domain. Accordingly, some embodiments include logic configured to generate a frequency-domain representation of the received at least a portion of the uplink random access transmission; logic configured to generate a frequency-domain signal by multiplying the frequency-domain representation of the received at least a portion of the uplink random access transmission by a frequency-domain representation of a known preamble sequence; and logic configured to generate a time-domain signal from the frequency-domain signal. Additionally, a comparator is provided that ascertains whether the uplink random access transmission represented a random access preamble by comparing one or more elements of the time-domain signal with a threshold value. The threshold value can be scaled to indicate the presence of the random access preamble when only a portion of the uplink random access transmission matches a corresponding portion of the known preamble sequence.

In another aspect, correlation can be performed entirely in the time domain. Accordingly, some alternative embodiments include a sliding correlator that generates a correlation value indicative of a maximum degree of correlation between the received at least a portion of the uplink random access transmission and a known preamble sequence. Whether the uplink random access transmission represented a random access preamble is ascertained by comparing the correlation value with a threshold value.

In yet another aspect of some embodiments, the threshold value is scaled to indicate the presence of the random access preamble when only a portion of the uplink random access transmission matches a corresponding portion of the known preamble sequence.

BRIEF DESCRIPTION OF THE DRAWINGS

The objects and advantages of the invention will be understood by reading the following detailed description in conjunction with the drawings in which.

DETAILED DESCRIPTION

Figure 1:
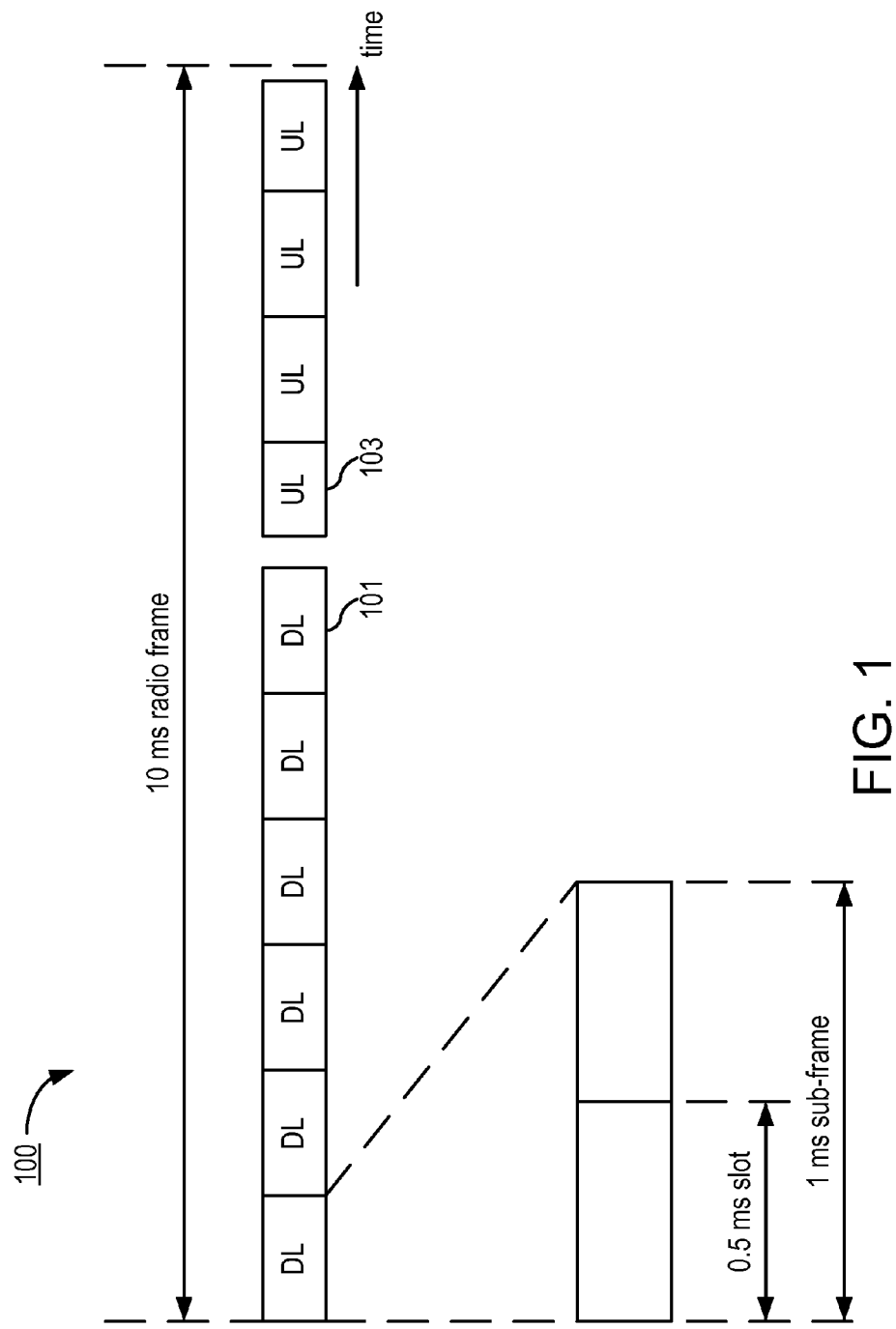
FIG. 1 is an exemplary radio frame suitable for communications systems like the 3G LTE system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In conventional TDD systems, the UE's uplink transmission of the random access (RA) preamble starts after it has fully received the NodeB's downlink transmission. In this way, the TDD transceiver in the NodeB has time to switch from transmit mode (downlink) to receive mode (uplink) and is ready in time to receive the entire RA preamble from even the closest UEs for which the round-trip delay (RTD) is minimal. The inventor of the subject matter claimed herein has recognized, however, that the NodeB does not need to receive the entire preamble for a reliable RA detection to take place. In particular, for nearby UEs, a shortened preamble is sufficient for reliable RA detection. Accordingly, an aspect of embodiments consistent with the invention involves applying a fixed timing advance (TA) for the preamble transmission in the UE that causes the UE to transmit the preamble while downlink transmissions are still occurring. The timing advance value is preferably close to or smaller than the maximum RTD. Because this is practiced in a TDD system, the early transmission of the preamble will not interfere with any uplink transmissions. The UE performing this early transmission must, of necessity, turn off its receiver. However, a UE that is performing a random access procedure is not yet in communication with the NodeB. Consequently, the UE can skip reception of the last part of the DL transmission just preceding the RA window and start transmission of the preamble with a TA without suffering any detrimental consequences.

Preambles transmitted by UEs that are close to the NodeB will arrive at the NodeB too soon; that is, while the NodeB is still transmitting. As a consequence, when the NodeB transceiver switches to reception, part of the preamble will have been missed. However, with proper dimensioning, the remaining part of the preamble will still have enough energy content to provide reliable RA detection. This is particularly so because preambles from UEs impacted the most (i.e., those closest to the NodeB) will experience the least amount of attenuation. It will be readily understood by those of ordinary skill in the art that, despite receiving only a partial preamble, no particular information is lost because the preamble is a sequence. Its presence or absence represents one bit of information which can be derived by correlating whatever part of the incoming sequence is received against the known sequence. If the correlation result exceeds a threshold value, its presence is declared. Furthermore, different preamble sequences can be used with good cross-correlation properties, so that the probability of a collision is reduced.

Moreover, in systems that apply a Cyclic Prefix (CP) to the transmission (e.g., systems such as like 3GPP LTE), the first part of the preamble is not used in the detection at all and no performance degradation will be experienced. Since the TA will take care of the uncertainty in timing due to an unknown RTD, no extra guard period needs to be reserved in the RA window for this purpose.

These and other aspects of embodiments consistent with the invention will now be discussed in greater detail.

As mentioned earlier, the timing misalignment in the uplink results from the propagation delay. This delay is the time it takes for the radio waves to travel from the NodeB to the UE and vice versa.

In TDD systems, the TA procedure is seriously restricted because the UE cannot start transmitting prior to the end of the received packet. However, this restriction is unnecessary during random access because the UE is not yet in communication with the network. It can first derive network information from the downlink broadcast channel (BCH), and then wait for the appropriate RA window and send a preamble. The UE does not have to wait until the downlink transmission just preceding the RA window has finished before it starts sending the preamble.

To consider a nonlimiting example, the physical layer of a 3G LTE system includes a generic radio frame having a duration of 10 ms. FIG. 1 illustrates one such frame 100 that has been proposed for use in a TDD mode. Each frame has 20 slots (numbered 0 through 19), each slot having a nominal duration of 0.5 ms. A sub-frame is made up of two adjacent slots, and therefore has a duration of 1 ms. There are 10 sub-frames per 10 ms radio frame. As an example, a TDD UL/DL imbalance of 6:4 has been chosen; that is, six DL slots and four UL slots per 10 ms radio frame. The first UL slot may be reserved for RA transmissions.

Figure 2:
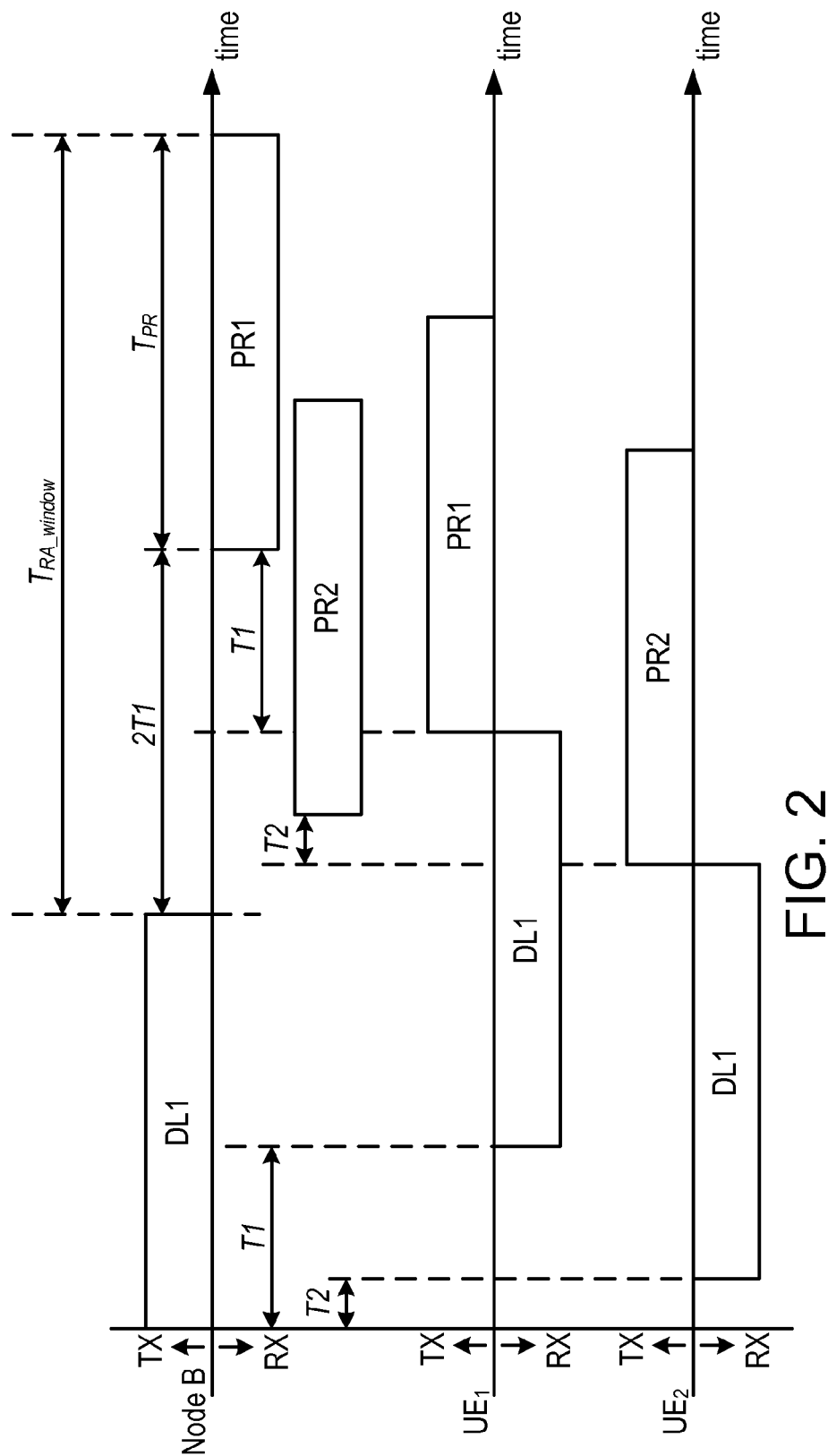
FIG. 2 is a timing diagram showing random access transmissions that can result from the use of conventional procedures, and the random access window that necessarily results.

FIG. 2 is a timing diagram showing exemplary random access transmissions that can result from the use of conventional procedures, and the random access window that necessarily results. In the diagram, for each of the transceivers (NodeB, $UE_1$ and $UE_2$), transmitted signals are shown above the time-axes and received signals below the time-axes. In this example, $UE_1$ is located at a maximum distance from NodeB and the associated propagation delay is at a maximum ($2T1=RTD_{max}$). It will be appreciated that what constitutes a maximum distance may not be the same in all cases. For example, a system can be designed such that a UE is expected to be handed off from a first NodeB to another NodeB when the distance between the UE and the first NodeB reaches or exceeds a certain amount. Consequently, this distance would be the maximum distance that the UE can be from the first NodeB and still be expected to communicate with the first NodeB. Under other circumstances, the maximum distance might correspond to the point at which the signal between the NodeB and the UE is lost (e.g., if there were no neighboring base stations to which the call could be handed off). The inventive aspects described herein are not limited by what constitutes a maximum distance between a NodeB and a UE.

Returning now to a discussion of the example, another terminal, $UE_2$, is closer to the NodeB, and therefore has a much smaller associated propagation delay (T2). Each of the UEs waits until the complete downlink transmission (DL1) has been received and then switches to transmit mode in order to send their respective preambles, PR1 and PR2. The preamble (PR2) of the nearby unit $UE_2$ arrives at the NodeB at a time that is 2·T2 after the conclusion of the downlink transmission. The preamble (PR1) of the far away unit UE1 arrives much later, at a time that is 2·T1 after the conclusion of the downlink transmission. It is clear that, in order to avoid any possibility of interference (overlap) of the preamble with the following UL (traffic) slots, a sufficient guard period (GP) needs to be included in the RA window; that is, the RA window length ($T_{RA\_window}$) must cover both the preamble length ($T_{PR}$) and the maximum round-trip delay. Thus, $$T_{RA\_window}=T_{PR}+RTD_{max}=T_{PR}+2T_1.$$

Figure 3:
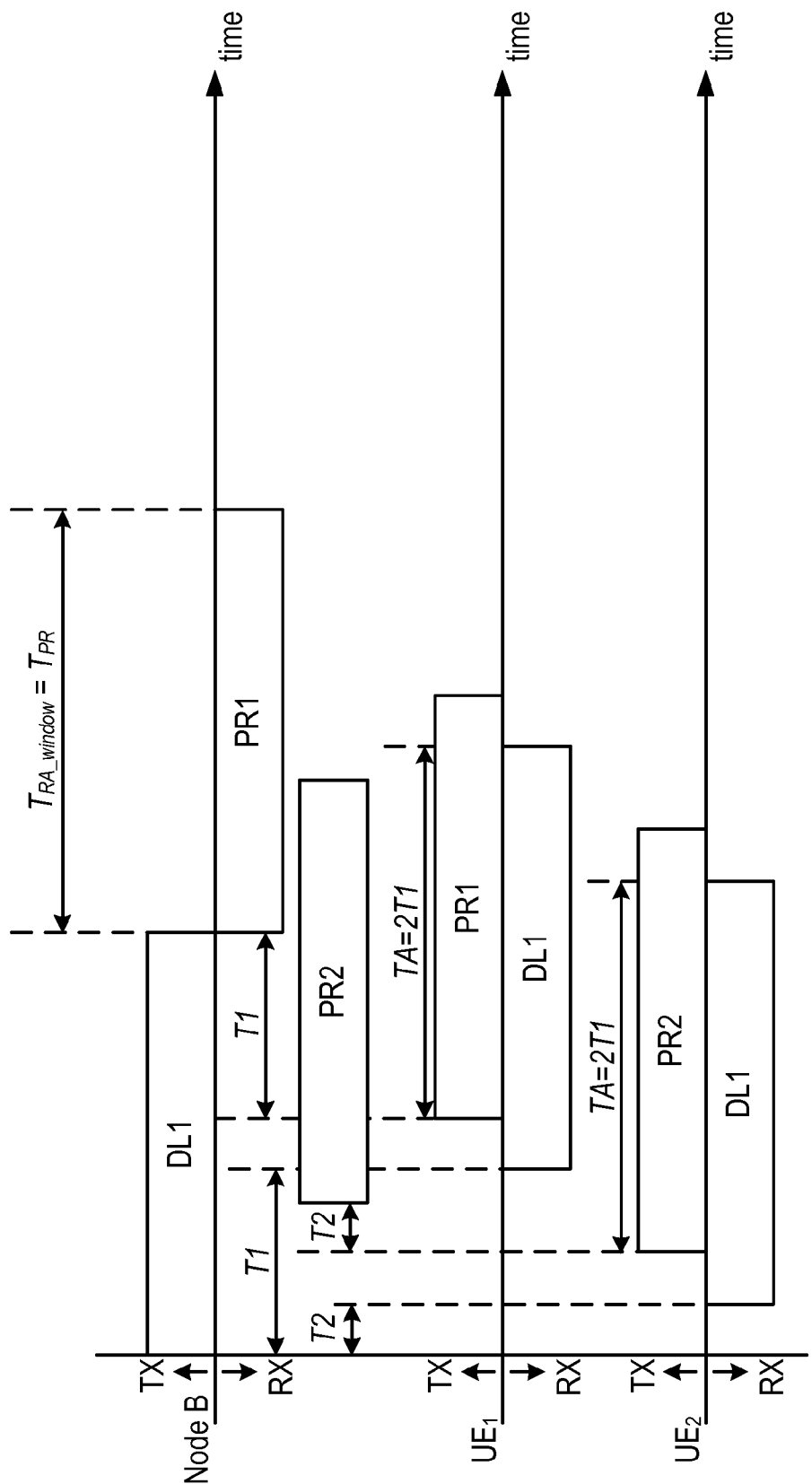
FIG. 3 is a timing diagram showing exemplary random access transmissions and the much shorter random access window that can consequently be achieved by using the innovative techniques described herein.

FIG. 3 is a comparable timing diagram, this time showing exemplary random access transmissions and the much shorter random access window that can consequently be achieved by using the innovative techniques described herein. In one aspect, each UE's transmission of the random access preamble is time advanced (TA) by a fixed amount corresponding to the maximum RTD that can occur in the cell. In this example, $RTD_{max}=2T_1$ since $UE_1$ is assumed to be located at the cell edge. Because of this early transmission, $UE_1$'s preamble (PR1) arrives and is received at the NodeB directly after the NodeB completes its downlink transmission (DL1).

Figure 4:
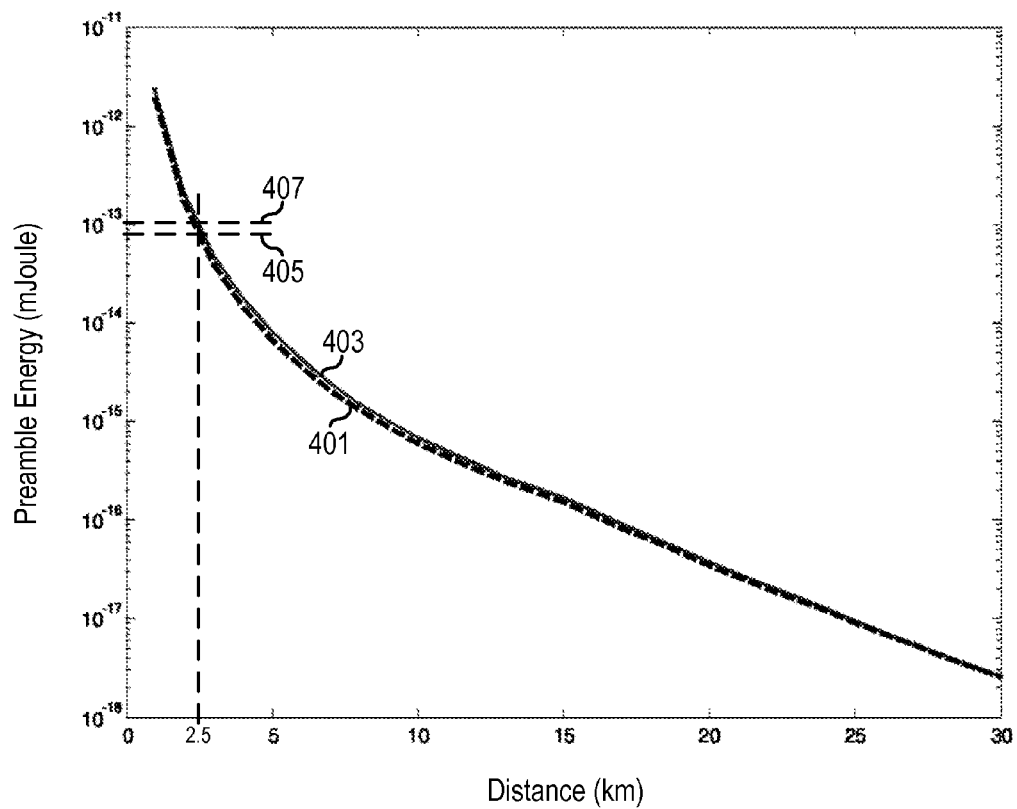
FIG. 4 depicts two graphs, the first being a graph of the preamble energy received with the fixed timing advance plotted as a function of distance between NodeB and UE, and the second being a graph of the preamble energy received without application of the fixed timing advance plotted as a function of distance.

By contrast, the preamble (PR2) of the nearby $UE_1$ is received too early (i.e., while NodeB is still transmitting DL1). This early arrival is also true of other preambles originating from other UEs (not shown) that are not at the cell edge. Since the NodeB can only start receiving when its transmission has ended, it misses an initial part of the preamble. However, this turns out not to have a detrimental affect on preamble detection because the UE's closer distance to the NodeB causes the propagation attenuation to be lower as well. Consequently, the preambles from closer UEs are received having a larger Signal-to-Noise Ratio (SNR) than signals from farther-away UEs. Furthermore, the total preamble energy received by the detector is larger for even the partial preambles of closer UEs than for the completely detected preambles received from more distant UEs. This comparison is illustrated in FIG. 4, which depicts a graph 401 (obtained from simulations) of the preamble energy received with the fixed timing advance plotted as a function of distance between NodeB and UE, and also shows a graph 403 (obtained from simulations) of the preamble energy received without application of the fixed timing advance plotted as a function of distance. In each case, the following parameters were applicable: preamble length of 1 ms, transmit power at the UE of 24 dBm, fixed timing advance of 200 µs. It is true that, for smaller distances, the total preamble energy without the timing advance is somewhat larger than when the timing advance is applied (at close distances, 20% of the preamble energy is lost—see, for example, the energy received with (405) and without (407) the fixed timing advance when the transmission distance between the NodeB and UE is 2.5 km). However, more important is that the preamble energy of the shortened preamble is always larger than the energy received from complete preambles of the most distant UE (at 30 km).

To ensure the best results, open loop power control should be applied. That is, the UE should transmit the preamble at full power independent of its location within the cell.

It can be seen from the above that use of a fixed timing advance takes care of the RTD timing uncertainty and consequently allows the guard period to be omitted. This can be used to advantage to reduce the duration of the RA window, $T_{RA\_window}$, as compared to the RA windows required by conventional techniques. Alternatively, use of a fixed timing advance permits the preamble length, $T_{PR}$, to be increased (relative to preamble lengths that can be accommodated by conventional techniques), which will provide larger coverage.

Because of the TDD arrangement, the part of the preamble that, in some instances, arrives too early will not interfere with other uplink transmissions (as it would do in FDD, where this concept is thus not applicable). However, a UE's early UL transmission of a preamble has the potential of interfering with other UEs' reception of the ongoing downlink transmission. It is believed that this will not pose much of a problem, however, because simulations have shown that UE-to-UE interference has very low impact due to the non-line-of-sight (NLOS) conditions between different UEs. An early preamble transmission could have some impact in hotspot areas, in which UEs are very closely spaced, but it must be noted that the RA procedure is carried out very infrequently. Therefore, the effect even on nearby terminals will be marginal.

The discussion above considered the GP resulting only from the RTD. In practice, guard periods may also be needed to account for the UL-DL and DL-UL switching times (i.e., for the radio transceivers to retune their TX and RX chains), and to incorporate inter-BS interference (i.e., DL transmissions from one or more distant NodeB's that may still be in the air when a NodeB changes from transmission to reception). Such GPs were left out of the discussion merely to facilitate a discussion of various aspects of the invention. However, it will be readily apparent to the person of ordinary skill in the art that such GPs can also be included in the concept as described above.

Figure 5:
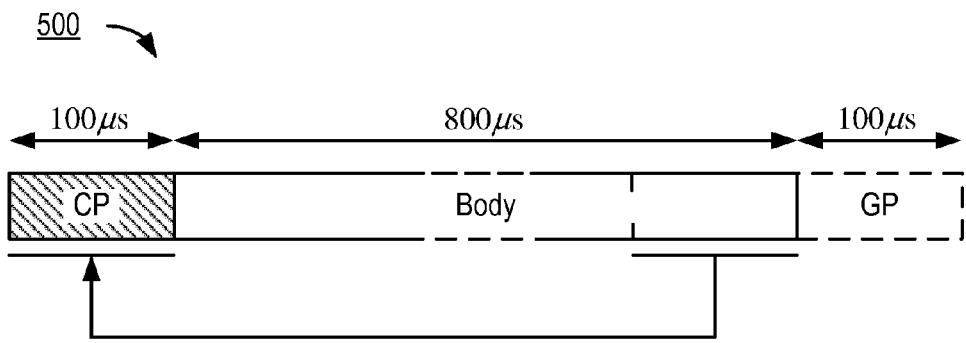
FIG. 5 illustrates an exemplary signal having a cyclic prefix (CP).

To further illustrate aspects of embodiments consistent with the invention, an exemplary embodiment useable in systems like LTE TDD will now be described. The radio interface of systems like LTE TDD utilizes sub-frames having a duration of 1 ms (see, e.g., FIG. 1). The RA window will therefore be 1 ms. In LTE TDD (and similar systems), it is advantageous to process the UL signals in the frequency domain. In order to maintain the circular properties of the received signals, a cyclic prefix (CP) is included in the preamble. FIG. 5 is an example of a conventional sequence 500 having a cyclic prefix (CP). The information contained in the CP is a replica of information found at an end portion of the body of the sequence to be transmitted. In conventional RA embodiments using a CP, the length of the CP is typically chosen to be the same as the length of the GP. To take the generic frame structure of LTE as an example, typical values are CP=GP=100 µs and $T_{pr}$=800 µs, as illustrated in the figure. (It will be noted that an alternative frame structure having a duration of only 0.675 ms has also been proposed for LTE TDD, which requires an even shorter preamble to be used for the RA procedure.)

Figure 6:
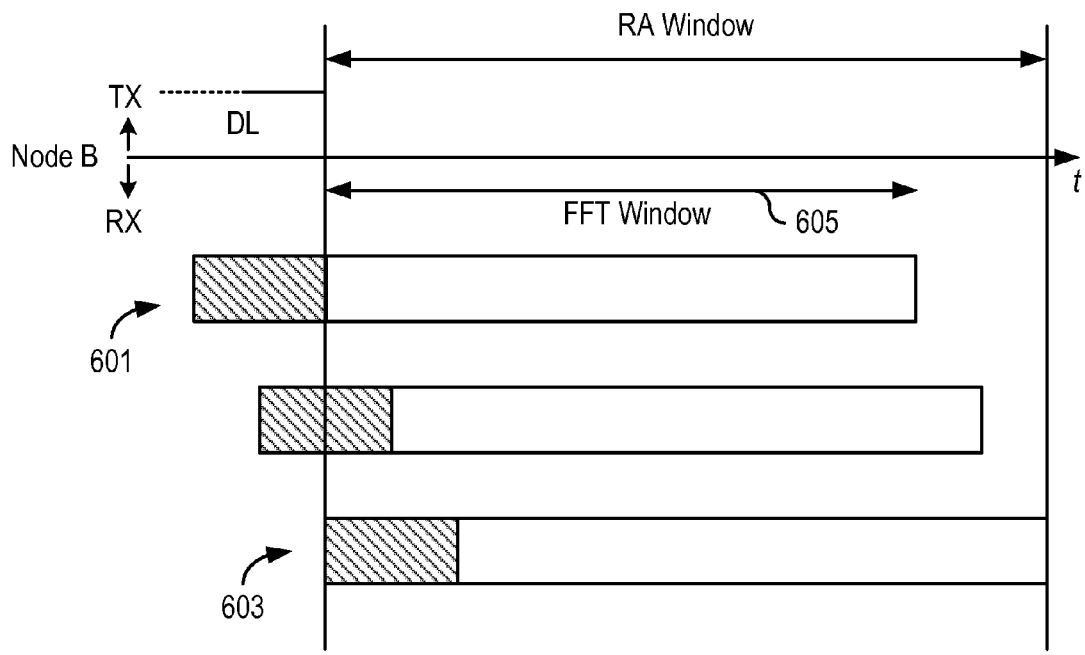
FIG. 6 is a timing diagram illustrating how the FFT window begins directly at the start of the RA window, in accordance with an aspect of some embodiments of the invention.

However, it will be recalled that when the various inventive concepts are applied, there is no GP, and the preamble including the CP may fill the entire RA window. Compared with the conventional method in which the RA window has to include the preamble with CP and the GP, the current invention permits a designer either to select a larger CP or a larger preamble body. The length of the required CP still corresponds to the maximum RTD plus the maximum rms delay due to multipath $T_{cp}$=RTD$_{max}$+$T_{ds}$ (where $T_{ds}$ represents a delay spread value derived from the maximum rms delay spread, $\sigma_\tau$). Unlike conventional techniques in which the NodeB starts its Fast Fourier Transform (FFT) detection window after a delay of CP after the start of the RA window, an aspect of the invention has the FFT window starting directly when the RA window starts. This is depicted in the timing diagram of FIG. 6. It can be seen that, regardless of whether one considers an earliest-arriving preamble 601 or a latest arriving preamble 603, the presence of the CP ensures that complete information is situated within the FFT window 605, so that no performance degradation is experienced.

Because the designer does not have to leave room for a GP, the designer has some leeway to make design tradeoffs. For example, given a 1 ms RA window (and therefore a 1 ms preamble length), one could implement a preamble body of 800 µs and a CP length of 200 µs. With the same preamble body as in a conventional system (e.g., an LTE TDD system), the CP is now twice the length of the CP with the conventional method. This enables the receiver to cope with twice the RTD$_{max}$. Other lengths can also be chosen; for example one can keep a CP of 100 µs but increase the preamble body to 900 µs to achieve better SNR performance.

Embodiments will now be described that take into account guard periods for DL-UL and UL-DL switching. In conventional systems, these guard periods come at the expense of some other part of the preamble, such as the initial 0.1 ms guard period $T_{GT}$, which takes into account the unknown round-trip delay. As a consequence, the maximum cell radius that can be supported would be reduced.

Figure 7:
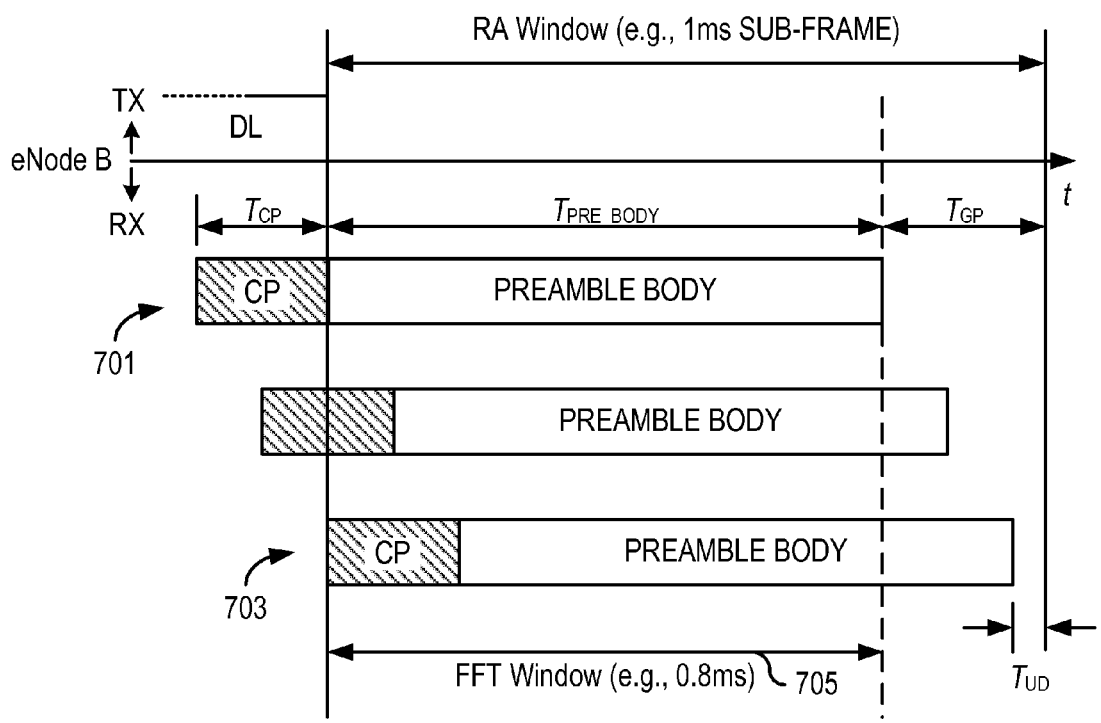
FIG. 7 is a timing diagram illustrating potential situations at an exemplary enhanced NodeB when a fixed timing advance is applied to uplink RA transmissions in accordance with an aspect consistent with embodiments of the invention.

However, in an aspect of embodiments consistent with the invention, if fixed timing advance is applied as described earlier, the situation is improved to that depicted in the timing diagram of FIG. 7, which shows potential situations at an exemplary enhanced NodeB ("eNodeB"). The FFT window begins at the sub-frame edge, and its duration depends on the type of system being implemented (e.g., 0.8 ms for a general TDD system, or "gTDD"). Notice that, due to the fixed timing advance, the CP length $T_{CP}$ has been increased to:

$$T_{CP}=\text{Duration of sub-frame}(\text{e.g., 1 ms})-T_{PRE\_BODY}-T_{UD}$$

where $T_{UD}$ is the UL-DL switching time. Furthermore, the effective guard period has been increased to the same amount. With $T_{UD}$ on the order of a few microseconds, the timing advance concept has greatly improved the maximum cell size of the RA procedure (by almost twice). If the preamble sequence duration is maintained at $T_{PRE\_BODY}$=800 µs (as in a conventional gTDD system), a guard period of about 200 µs is achieved, which would support cell sizes up to 30 km. Alternatively, or in addition, one could increase the preamble sequence length $T_{PRE\_BODY}$ (at the expense of $T_{GP}$) in order to increase the preamble energy $E_p$. Any number of optimizations are possible as long as the following condition is satisfied:

$$T_{CP}+T_{PRE\_BODY}+T_{UD}=\text{Duration of sub-frame(e.g., 1 ms)}.$$

It is again noted that, unlike in FDD operation where such a large timing advance would cause collisions with preceding UL sub-frames, in TDD mode only a DL sub-frame precedes the RA window. Because it is typically the case that $T_{CP}>T_{DU}$, the CP of the RA preamble transmission may affect the DL performance of nearby UEs. However, as noted before, the propagation conditions to nearby UEs are, in most cases, NLOS, and the transmission of RA preambles is very infrequent. Consequently, one UE interfering with another would not happen very often. For added protection against such interference, one could increase $T_{DU}$ (the downlink-to-uplink switching time) by further truncation of the last DL sub-frame (e.g., the sub-frame 101 illustrated in FIG. 1).

The various aspects are equally applicable in the alternative TDD (aTDD) frame structure that has been proposed for LTE. That frame structure includes a sub-frame having a duration of only 0.8 ms. Accordingly, the Uplink Pilot Time Slot (UpPTS) field can be combined with a first UL sub-frame (e.g., the sub-frame 103 illustrated in FIG. 1) to form a 0.8 ms RA window. In such embodiments, various optimizations of the cyclic prefix length $T_{CP}$ and preamble sequence length $T_{PRE\_BODY}$ are possible as long as the following condition is satisfied:

$$T_{CP}+T_{PRE\_BODY}+T_{UD}=0.8 \text{ ms}.$$

With this arrangement, the RA performance of an aTDD system can approximate the RA performance obtained in gTDD and FDD.

Figure 8A:
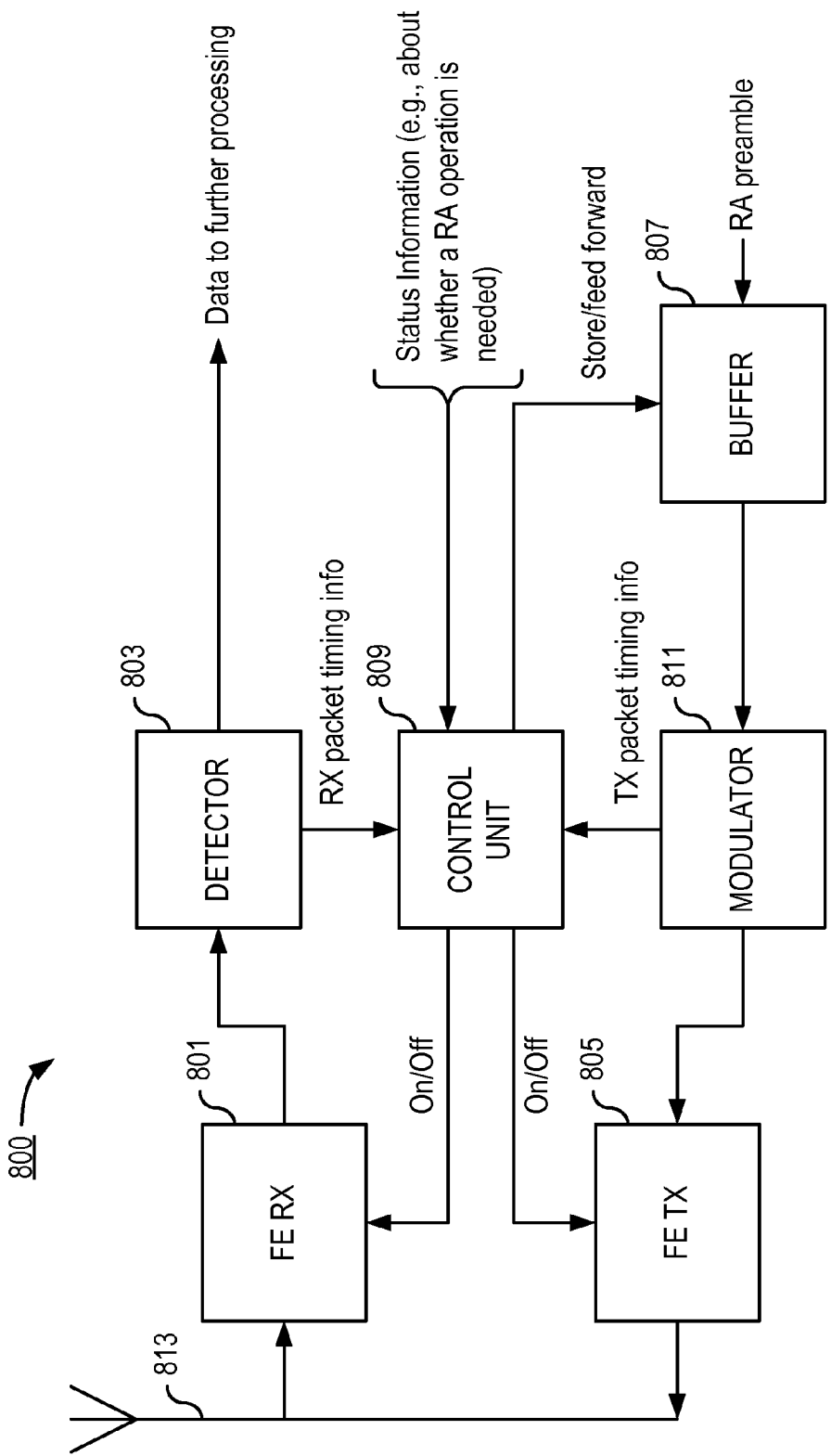
FIG. 8a is a block diagram of exemplary transceiver equipment adapted to carry out various aspects of the invention in a mobile terminal.
Figure 8B:
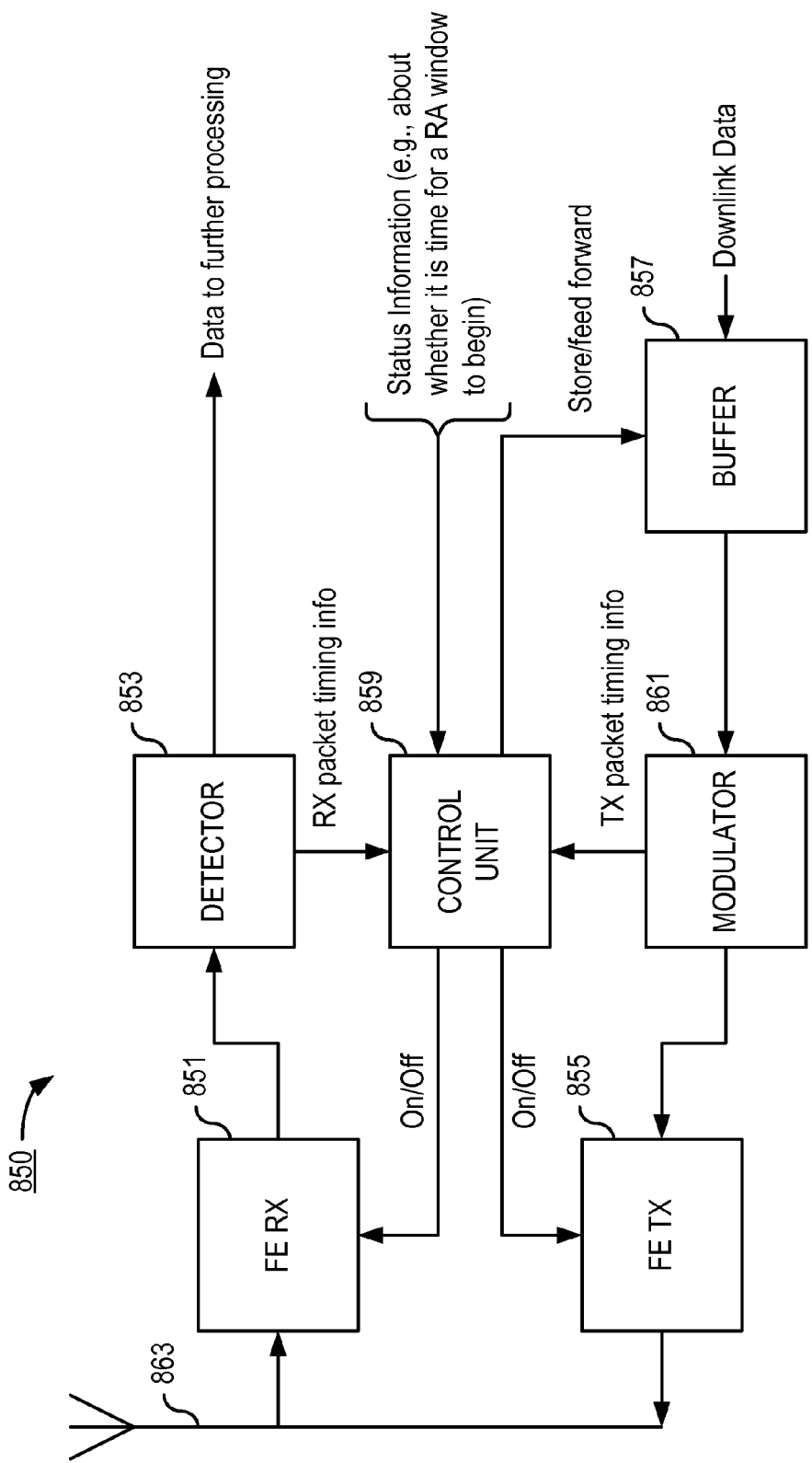
FIG. 8b is a block diagram of exemplary transceiver equipment adapted to carry out various aspects of the invention in a base station.

FIG. 8a is a block diagram of exemplary transceiver equipment 800 adapted to carry out various aspects of the invention in a mobile terminal (e.g., a UE), and FIG. 8b is a block diagram of exemplary transceiver equipment 850 adapted to carry out various aspects of the invention in a base station (e.g., NodeB, eNodeB).

Considering FIG. 8a first, the transceiver equipment 800 includes a front-end receiver (FE RX) 801 for receiving and down-converting data packets. The front-end receiver 801 supplies a baseband signal to a detector 803 that demodulates the received signal. The data generated by the detector 803 is then supplied to other components for further processing (not shown).

The transceiver 800 also includes a front-end transmitter (FE TX) 805. Data to be transmitted is stored in a transmit buffer 807 that is controlled by a control unit 809. The control unit 809 uses status information (e.g., information about the need to perform a random access procedure) to determine its operation at any given time. This operation will be described in greater detail below.

When the control unit 809 determines that transmission should take place, the front-end transmitter 805 is turned on and data (e.g., an uplink random access preamble) is fed from the transmit buffer 807 to a modulator 811. The modulated baseband signal is then fed to the front-end transmitter 805, which up-converts the modulated baseband signal to the transmitter's carrier frequency. The generated radio signal is then transmitted through an antenna 813 to the intended recipient (e.g., a NodeB). Upon conclusion of the transmission, the front-end transmitter 805 is turned off.

The control unit 809 also controls operation of the front-end receiver 801, and schedules various operations as required for the proper receiver operation of the transceiver equipment. Such operation is beyond the scope of the invention, and is therefore not described here in detail.

Figure 9:
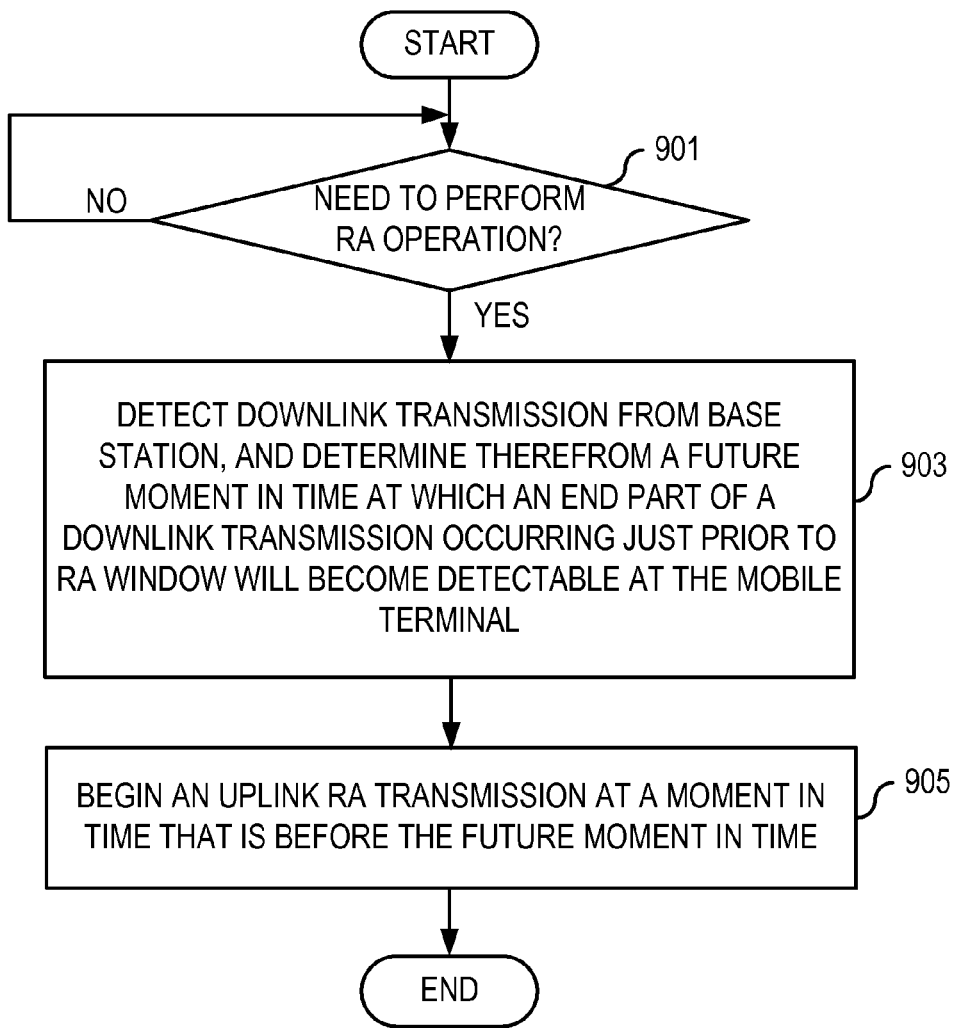
FIG. 9 is a flow diagram of exemplary steps/processes carried out by a mobile terminal in accordance with aspects consistent with embodiments of the invention.

The control unit 809 may carry out exemplary steps/processes as will now be discussed with reference to FIG. 9. Among various other tasks that are not of relevance to the invention, a determination is made to ascertain whether a random access operation should be performed (decision block 901). This decision can be made, for example, based on status information provided to the control unit 809. If no random access operation needs to be performed ("NO" path out of decision block 901) the mobile terminal continues with its other tasks (not shown).

If a random access operation should be performed ("YES" path out of decision block 901), then the control unit 809 detects a downlink transmission from the base station, and determines therefrom a future moment in time at which an end part of a downlink transmission just prior to a random access window will become detectable at the mobile terminal (step 903). In this regard, it will be understood that the UE will typically receive one or more bursts on a downlink Broadcast Control Channel (BCCH) in the frames prior to the frame in which the random access window is located. From those BCCH detection(s), the UE can locate (from the point of view of the UE) the timing of the random access window (or put another way, locate a future moment in time at which an end part of a downlink transmission just prior to the random access window will become detectable at the mobile terminal). The random access window is repetitive, and occurs in any frame. Thus, in the frame in which the UE intends to perform a random access operation, it will normally not do any downlink detection at all, but will instead use its previously determined timing information to just wait for the random access event to occur.

Having determined the future moment in time, the control unit 809 then causes the mobile terminal to begin an uplink random access transmission at a moment in time that is before the future moment in time (i.e., a timing advance is applied to the uplink random access transmission) (step 905).

The discussion will now turn to the base station embodiment depicted in FIG. 8b. The transceiver equipment 850 includes a front-end receiver (FE RX) 851 for receiving and down-converting data packets. The front-end receiver 851 supplies a baseband signal to a detector 853 that demodulates the received signal. The data generated by the detector 853 is then supplied to other components for further processing (not shown).

The transceiver 850 also includes a front-end transmitter (FE TX) 855. Data to be transmitted is stored in a transmit buffer 857 that is controlled by a control unit 859. The control unit 859 uses status information (e.g., information indicating that it is time for a random access window to begin) to determine its operation at any given time. This operation will be described in greater detail below.

When the control unit 859 determines that transmission should take place, the front-end transmitter 855 is turned on and data is fed from the transmit buffer 857 to a modulator 861. The modulated baseband signal is then fed to the front-end transmitter 855, which up-converts the modulated baseband signal to the transmitter's carrier frequency. The generated radio signal is then transmitted through an antenna 863 to the intended recipient(s) (e.g., one or more UEs). Upon conclusion of the transmission, the front-end transmitter 855 is turned off.

The control unit 859 also controls operation of the front-end receiver 851, and schedules various operations as required for the proper receiver operation of the transceiver equipment. Such operation is beyond the scope of the invention, and is therefore not described here in detail.

Figure 10:
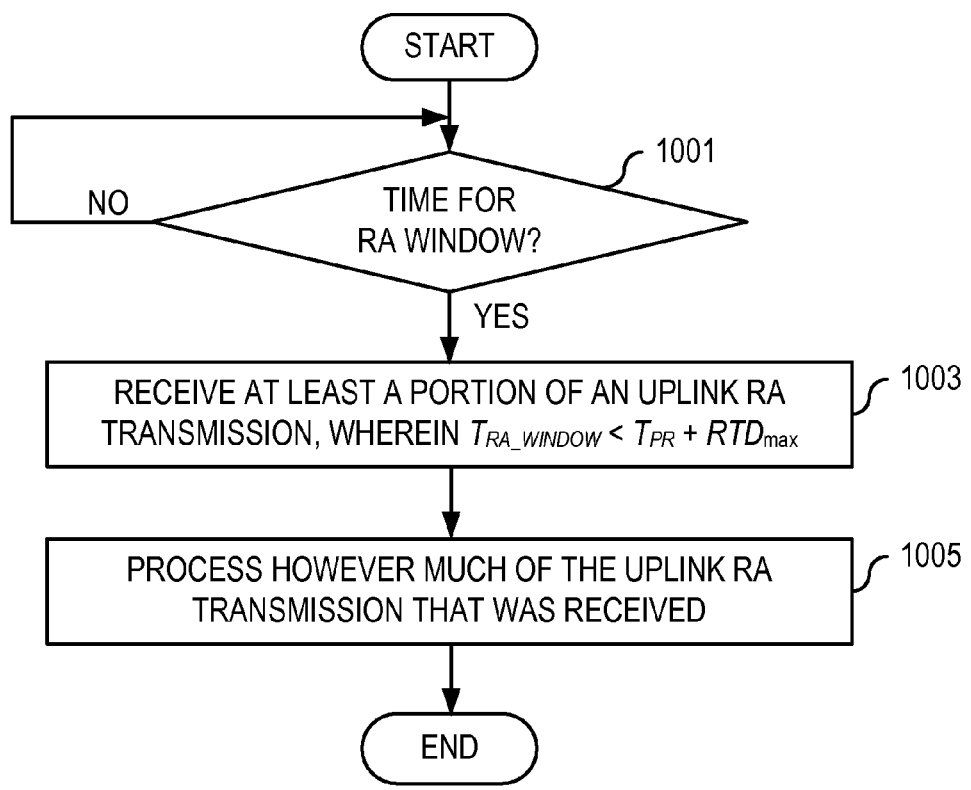
FIG. 10 is a flow diagram of exemplary steps/processes carried out by a base station in accordance with aspects consistent with embodiments of the invention.

The control unit 809 may carry out exemplary steps/processes as will now be discussed with reference to FIG. 10.

Among various other tasks that are not of relevance to the invention, a determination is made to ascertain whether it is coming time for a random access window to occur (decision block 1001). If not ("NO" path out of decision block 1001), the base station continues with its other tasks (not shown).

If it is time for a random access operation to occur ("YES" path out of decision block 100), the front-end receiver 851 and detector 853 are operated to detect whatever portion of an uplink random access transmission might be arriving (step 1003). It will be recalled that, due to the timing advance, a complete RA preamble will be received from only the most-distant mobile terminals; for all others, some portion of the RA preamble will arrive too early to be received, and will consequently be lost. Of relevance is that the duration of the random access window, $T_{RA\_window}$ satisfies the following relationship:

$$T_{RA\_window} < T_{PR} + RTD_{max},$$

where $T_{PR}$ is a duration of the uplink random access transmission, and $RTD_{max}$ is a maximum possible round trip delay between the base station and any one of the one or more mobile terminals.

The control unit 859 then causes the base station to process however much of the uplink random access transmission was received (step 1005). This processing can be performed in accordance with known techniques that need not be described here in great detail. When cyclic prefixes are used, such detection can be performed, for example, by processing the signals in the frequency domain by means of an FFT, such as is described in PCT/SE2007/050037. A frequency-domain representation of the received portion of the uplink random access transmission is generated. A frequency-domain signal is generated by multiplying the frequency-domain representation of the portion of the received uplink random access transmission by a frequency-domain representation of a known preamble sequence. A time-domain signal is generated from the frequency-domain signal (e.g., by means of an Inverse Fast Fourier Transform—"IFFT"). Whether the uplink random access transmission represented a random access preamble is ascertained by comparing one or more elements of the time-domain signal with a threshold value. The threshold value may be scaled to indicate the presence of the random access preamble when only a portion of the uplink random access transmission matches a corresponding portion of the known preamble sequence.

Alternatively, preamble detection can be performed by means of sliding correlators in the time domain. In such embodiments, the output of the correlator is compared with a threshold to decide whether or not sufficient match was found. Setting the threshold at a low level results in a high false alarm rate, and setting the threshold at a high level results in a high false reject (or missed detection) rate. In mobile systems, the appropriate threshold TH is dependent on the SNR: the higher the SNR, the lower the threshold, in accordance with $$TH = a \cdot \sigma^2,$$

where $\sigma^2$ is the estimated noise variance at the correlator input. For use in embodiments of the invention, the parameter a may be different from that which is conventionally chosen because the threshold is normally based on the entire sequence length. In the present instance, only part of the sequence may be detected, so the value of a may be smaller in order to reduce the missed detection probability.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way.

For example, the above-described embodiments all employ a timing advance that corresponds to a maximum possible RTD between the base station and the mobile terminal. However, some benefits of the invention can still be attained when the amount of fixed timing advance is a smaller number, so that more generally, the mobile terminal begins an uplink random access transmission at a moment in time that is before a moment in time at which an end part of the downlink transmission will become detectable at the mobile terminal.

Also, it will be recognized that, given a fixed size downlink transmission (e.g., DL1 in FIG. 3), starting an uplink RA transmission at a moment in time that is a fixed amount of time before an anticipated end of the downlink transmission is equivalent to starting the uplink RA transmission at a moment in time that is a fixed amount of time from an initial moment at which the downlink transmission is first detected.

The scope of the invention is therefore given by the appended claims, rather than the preceding description, and all variations and equivalents which fall within the range of the claims are intended to be embraced therein.

What is claimed is:

1. A method of operating a mobile terminal in a cellular communications system that comprises a base station operating in a time division duplex mode, the method comprising:
    ascertaining a need to perform a random access operation;
    in response to said ascertaining, detecting a downlink transmission from the base station and locating therefrom the timing of an upcoming random access window and determining a future moment in time at which an end part of a sub-frame of a downlink transmission just prior to the upcoming random access window will become detectable at the mobile terminal; and
    skipping reception of at least a last part of the sub-frame of the downlink transmission just prior to the upcoming random access window and beginning an uplink random access transmission at a moment in time that is before the future moment in time.

2. The method of claim 1, wherein the moment in time that is before the future moment in time is a fixed amount of time before the future moment in time.

3. The method of claim 2, wherein the fixed amount of time corresponds to a maximum possible round trip delay between the base station and the mobile terminal.

4. The method of claim 1, wherein the uplink random access transmission comprises a body and a cyclic prefix, the cyclic prefix comprising an end portion of the body.

5. A method of operating a base station in a time division duplex mode in a cellular communications system, the method comprising:
    during a random access window that begins directly after a downlink transmission directed to one or more mobile terminals, receiving at least a portion of an uplink random access transmission from one of the one or more mobile terminals,
    wherein a duration of the random access window, $T_{RA\_window}$ satisfies the following relationship:

$$T_{PR} \leq T_{RA\_window} < T_{PR} + RTD_{max},$$

where $T_{PR}$ is an entire duration of the uplink random access transmission, and $RTD_{max}$ is a maximum possible round trip delay between the base station and any one of the one or more mobile terminals, wherein $T_{RA\_window}$ satisfies:

$$T_{RA\_window}=T_{PR}+T_{UD},$$

wherein $T_{UD}$ is a duration of an uplink-downlink switching time.

6. A method of operating a base station in a time division duplex mode in a cellular communications system, the method comprising:

during a random access window that begins directly after a downlink transmission directed to one or more mobile terminals, receiving at least a portion of an uplink random access transmission from one of the one or more mobile terminals, wherein a duration of the random access window, $T_{RA\_window}$ satisfies the following relationship:

$$T_{PR} \leq T_{RA\_window} < T_{PR} + RTD_{max},$$

where $T_{PR}$ is an entire duration of the uplink random access transmission, and $RTD_{max}$ is a maximum possible round trip delay between the base station and any one of the one or more mobile terminals, wherein:

the uplink random access transmission comprises a preamble body and a cyclic prefix;
the preamble body has a duration of $T_{PRE\_BODY}$; and
the cyclic prefix has a duration of $T_{CP}$,
whereby $T_{PR}=T_{CP}+T_{PRE\_BODY}$.

7. The method of claim 6, comprising:

generating a frequency-domain representation of the received at least a portion of the uplink random access transmission;

generating a frequency-domain signal by multiplying the frequency-domain representation of the received at least a portion of the uplink random access transmission by a frequency-domain representation of a known preamble sequence;

generating a time-domain signal from the frequency-domain signal; and ascertaining whether the uplink random access transmission represented a random access preamble by comparing one or more elements of the time-domain signal with a threshold value.

8. The method of claim 7, wherein the threshold value is scaled to indicate the presence of the random access preamble when only a portion of the uplink random access transmission matches a corresponding portion of the known preamble sequence.

9. The method of claim 6, comprising:

using a sliding correlator to generate a correlation value indicative of a maximum degree of correlation between the received at least a portion of the uplink random access transmission and a known preamble sequence; and ascertaining whether the uplink random access transmission represented a random access preamble by comparing the correlation value with a threshold value.

10. The method of claim 9, wherein the threshold value is scaled to indicate the presence of the random access preamble when only a portion of the uplink random access transmission matches a corresponding portion of the known preamble sequence.

11. An apparatus in a mobile terminal that interacts with a cellular communications system that comprises a base station operating in a time division duplex mode, the apparatus comprising:

logic circuitry configured to ascertain a need to perform a random access operation;

logic circuitry configured to detect, in response to said ascertaining, a downlink transmission from the base station and to locate therefrom the timing of an upcoming random access window and to determine a future moment in time at which an end part of a sub-frame of a downlink transmission just prior to the upcoming random access window will become detectable at the mobile terminal; and logic circuitry configured to skip reception of at least a last part of the sub-frame of the downlink transmission just prior to the upcoming random access window and to begin an uplink random access transmission at a moment in time that is before the future moment in time.

12. The apparatus of claim 11, wherein the moment in time that is before the future moment in time is a fixed amount of time before the future moment in time.

13. The apparatus of claim 12, wherein the fixed amount of time corresponds to a maximum possible round trip delay between the base station and the mobile terminal.

14. The apparatus of claim 11, wherein the uplink random access transmission comprises a body and a cyclic prefix, the cyclic prefix comprising an end portion of the body.

15. An apparatus in a base station that operates in a time division duplex mode within a cellular communications system, the apparatus comprising:

logic circuitry configured to perform a downlink transmission directed to one or more mobile terminals; and logic circuitry configured to receive at least a portion of an uplink random access transmission from one of the one or more mobile terminals during a random access window that begins directly after the downlink transmission, wherein a duration of the random access window, $T_{RA\_window}$ satisfies the following relationship:

$$T_{PR} \leq T_{RA\_window} < T_{PR} + RTD_{max},$$

where $T_{PR}$ is an entire duration of the uplink random access transmission, and $RTD_{max}$ is a maximum possible round trip delay between the base station and any one of the one or more mobile terminals, wherein $T_{RA\_window}$ satisfies:

$$T_{RA\_window}=T_{PR}+T_{UD},$$

wherein $T_{UD}$ is a duration of an uplink-downlink switching time.

16. An apparatus in a base station that operates in a time division duplex mode within a cellular communications system, the apparatus comprising:

logic circuitry configured to perform a downlink transmission directed to one or more mobile terminals; and logic circuitry configured to receive at least a portion of an uplink random access transmission from one of the one or more mobile terminals during a random access window that begins directly after the downlink transmission, wherein a duration of the random access window, $T_{RA\_window}$ satisfies the following relationship:

$$T_{PR} \leq T_{RA\_window} < T_{PR} + RTD_{max},$$

where $T_{PR}$ is an entire duration of the uplink random access transmission, and $RTD_{max}$ is a maximum possible round trip delay between the base station and any one of the one or more mobile terminals,
wherein:
the uplink random access transmission comprises a preamble body and a cyclic prefix;
the preamble body has a duration of $T_{PRE\_BODY}$; and
the cyclic prefix has a duration of $T_{CP}$,
whereby $T_{PR}=T_{CP}T_{PRE\_BODY}$.

17. The apparatus of claim 16, comprising:
logic circuitry configured to generate a frequency-domain representation of the received at least a portion of the uplink random access transmission;
logic circuitry configured to generate a frequency-domain signal by multiplying the frequency-domain representation of the received at least a portion of the uplink random access transmission by a frequency-domain representation of a known preamble sequence;
logic circuitry configured to generate a time-domain signal from the frequency-domain signal; and
a comparator that ascertains whether the uplink random access transmission represented a random access preamble by comparing one or more elements of the time-domain signal with a threshold value.

18. The apparatus of claim 17, wherein the threshold value is scaled to indicate the presence of the random access preamble when only a portion of the uplink random access transmission matches a corresponding portion of the known preamble sequence.

19. The apparatus of claim 16, comprising:
a sliding correlator that generates a correlation value indicative of a maximum degree of correlation between the received at least a portion of the uplink random access transmission and a known preamble sequence; and
a comparator that ascertains whether the uplink random access transmission represented a random access preamble by comparing the correlation value with a threshold value.

20. The apparatus of claim 19, wherein the threshold value is scaled to indicate the presence of the random access preamble when only a portion of the uplink random access transmission matches a corresponding portion of the known preamble sequence.

* * * * *

UNITED STATES PATENT AND TRADEMARK OFFICE
CERTIFICATE OF CORRECTION

PATENT NO. : 8,243,634 B2
APPLICATION NO. : 11/828315
DATED : August 14, 2012
INVENTOR(S) : Haartsen It is certified that error appears in the above-identified patent and that said Letters Patent is hereby corrected as shown below:

In Column 15, Line 8, in Claim 16, delete "$T_{PR}=T_{CP}T_{PRE\_BODY}.$" and insert -- $T_{PR}=T_{CP}+T_{PRE\_BODY}.$ --, therefor.

Signed and Sealed this
Eighteenth Day of December, 2012

David J. Kappos
*Director of the United States Patent and Trademark Office*